(12) United States Patent
Fukasaka

(10) Patent No.: US 6,359,648 B1
(45) Date of Patent: *Mar. 19, 2002

(54) HIGH-QUALITY IMAGE INPUT APPARATUS WITH MOTION COMPENSATION FUNCTION

(75) Inventor: Toshihiro Fukasaka, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,204

(22) Filed: Jun. 20, 1996

(30) Foreign Application Priority Data

Jun. 23, 1995 (JP) .............................. 7-157766

(51) Int. Cl.⁷ .............................. H04N 5/228
(52) U.S. Cl. ..................... 348/208; 348/231
(58) Field of Search ................ 348/207, 208, 348/219, 220, 222, 239, 218, 231; 358/909.1, 906; 386/107, 117; H04N 5/228

(56) References Cited

U.S. PATENT DOCUMENTS

| | | | | |
|---|---|---|---|---|
| 5,307,170 A | * | 4/1994 | Itsumi et al. ................ | 348/219 |
| 5,469,210 A | * | 11/1995 | Noguchi et al. ............. | 348/208 |
| 5,569,190 A | * | 10/1996 | Noguchi et al. ............. | 348/208 |
| 5,596,366 A | * | 1/1997 | Takashima et al. ......... | 348/208 |
| 5,801,769 A | * | 9/1998 | Hirose ......................... | 348/208 |
| 5,867,213 A | * | 2/1999 | Ouchi ......................... | 348/208 |
| 5,889,553 A | | 3/1999 | Kino et al. .................. | 348/218 |

* cited by examiner

Primary Examiner—Tuan Ho
(74) Attorney, Agent, or Firm—Fitzpatrick, Cella, Harper & Scinto

(57) ABSTRACT

When an image pickup unit or an entire image input apparatus moves, in order to temporarily inhibit an image signal from being recorded on a recording means, the apparatus includes a motion sensor for detecting the motion level of an optical system from an optical axis changing device to an image pickup device and a CPU for controlling the operations of the optical axis changing device, a memory and an image synthesization device to temporarily inhibit an image signal from being recorded on the memory, when a motion detection signal output from the motion sensor. When the image pickup device or the entire image input apparatus moves, the motion is detected by the motion sensor to temporarily inhibit an image signal from being recorded on the memory, thereby performing image synthesization without being influenced by the above motion.

20 Claims, 15 Drawing Sheets

FIG. 13A

PIXEL OBJECT IMAGE P1 OF ORIGINAL

FIG. 13B

PIXEL OBJECT IMAGE P1 OF ORIGINAL

OBJECT IMAGE P2 SHIFTED BY ONE PIXEL TO THE RIGHT

HIGH-QUALITY IMAGE INPUT APPARATUS WITH MOTION COMPENSATION FUNCTION

BACKGROUND OF THE INVENTION

1. Field of the Invention

The present invention relates to a high-quality image input apparatus having a motion compensation function.

2. Related Background Art

In a conventional apparatus for obtaining a high-quality image, an optical axis from an object to be photographed is shifted to make a pixel shift and then a plurality of frames are picked up from the same object. These frames are temporarily recorded on a memory. Thereafter, the frames are synthesized into one image.

FIG. 15 is a block diagram showing a schematic arrangement of a conventional high-quality image input apparatus.

As shown in FIG. 15, the conventional high-quality image input apparatus includes a VAP (Variable Angle Prism) 121 for changing the optical axis for light from an object 111, a lens system 122 for transmitting light 201 from the VAP 121, an image pickup device 113 for imaging the object 111, and an optical axis control device 115 for controlling the VAP 121.

In addition, this apparatus includes a driver 116 for moving the VAP 121 to a predetermined position upon reception of a VAP control signal 204 output from the optical axis control device 115, a VAP position detection device 131 for detecting the position of the VAP 121 and feeding back the position of the VAP 121 as VAP position information 213 to the optical axis control device 115, and a memory selection switch 123 for selecting a plurality of frame memories for recording an image signal 205 from the image pickup device 113.

The apparatus also includes first frame memory (1) 125 to fourth frame memory (4) 128 for recording the image signal 205 from the image pickup device 113, and a read selection switch 124 for selecting a read operation of reading data from the first frame memory (1) 125 to fourth frame memory (4) 128.

The apparatus further includes an image synthesization device 118 for synthesizing a plurality of images read out from the first frame memory (1) 125 to fourth frame memory (4) 128 into one image, and outputting the image as a video signal, a video output terminal 130 for outputting a video signal 210 from the image synthesization device 118 to an external apparatus, and a CPU 119 for controlling the optical axis control device 115, the memory selection switch 123, the read selection switch 124, the image synthesization device 118, and the like.

Referring to FIG. 15, the CPU 119 outputs an optical axis control device control signal 208, a memory selection switch control signal 211, a read selection switch control signal 212, and an image synthesization device control signal 215.

The arrangement of the VAP 121 will be briefly described below. FIG. 12 shows the schematic arrangement of the VAP 121. The VAP 121 is designed to change the optical axis for light from an object in a yawing direction (right and left) and a pitch direction (up and down) by using lenses 301 and 302.

The lens 301 in the yawing direction is moved when a coil driving circuit 307 drives a coil 303 as a voice coil motor under the control of a control circuit 309.

The position of the lens 301 is detected by a position sensor 305 and fed back to the control circuit 309.

In the pitch direction as well, a coil 304, a coil driving circuit 308, and a position sensor 306 operate in the same manner as described above. In general, the VAP 121 is mounted in front of a lens system 310. The VAP 121 can slightly shift an optical axis in the yawing direction (right and left) and the pitch direction (up and down).

The operation of the conventional high-quality image input apparatus will be described next. First of all, the object 111 is imaged by the image pickup device 113, and the resultant data is stored in a memory. In this case, the memory selection switch 123 selects the first frame memory (1) 125. The image signal 205 from the image pickup device 113 is therefore recorded on the first frame memory (1) 125 selected by the memory selection switch 123.

The VAP 121 is then slightly moved in the yawing direction (right) to make a 1-pixel shift in the yawing direction (right). The optical axis control device 115 controls the VAP 121 to shift the image by one pixel in the yawing direction (right).

When the image is shifted by one pixel in the yawing direction (right), the memory selection switch 123 selects the second frame memory (2) 126. In this case, therefore, the image signal 205 from the image pickup device 113 is recorded on the second frame memory (2) 126 selected by the memory selection switch 123.

The VAP 121 is then slightly moved in the pitch direction (down) to make a 1-pixel shift in the pitch direction (down). The optical axis control device 115 controls the VAP 121 to shift the image by one pixel in the pitch direction (down).

When the image is shifted by one pixel in the pitch direction (down), the memory selection switch 123 selects the third frame memory (3) 127. In this case, therefore, the image signal 205 from the image pickup device 113 is recorded on the third frame memory (3) 127 selected by the memory selection switch 123.

The VAP 121 is then slightly moved in the yawing direction (left) opposite the direction in the previous yawing operation to make a 1-pixel shift in the yawing direction (left). The optical axis control device 115 controls the VAP 121 to shift the image by one pixel in the yawing direction (left) opposite the direction in the previous operation.

When the image is shifted by one pixel in the yawing direction (left) opposite the direction in the previous yawing operation, the memory selection switch 123 selects the fourth frame memory (4) 128. In this case, therefore, the image signal 205 from the image pickup device 113 is recorded on the fourth frame memory (4) 128 selected by the memory selection switch 123.

In this manner, the same object is imaged while the object is shifted in the yawing and pitch directions pixel by pixel. The picked-up images are sequentially recorded on the first frame memory (1) 125 to fourth frame memory (4) 128.

Subsequently, the data recorded on the first frame memory (1) 125 to fourth frame memory (4) 128 are sequentially read out through the read selection switch 124. The readout data are synthesized into one image by the image synthesization device 118. The image synthesized by the image synthesization device 118 is output as the video signal 210 from the video output terminal 130.

FIGS. 13A, 13B, 14A, and 14B show object images (the portions painted in gray) formed on the image pickup area of a CCD when the optical path of light from the object is changed using an optical axis changing device, i.e., the relationship between an object image P1 of an original, the image pickup areas of the CCD having a complementary color mosaic filter when the object image P1 of the original is sequentially shifted by one pixel to the right, a lower right hand direction, and down, and object images formed in the image pickup area.

FIG. 13A shows the positional relationship between the image pickup area and the object image P1 of the original.

FIG. 13B shows the relationship between the image pickup area and an object image P2 shifted by one pixel to the right with respect to the object image P1.

FIG. 14A shows the relationship between the image pickup area and an object image P3 shifted by one pixel to the lower right hand direction with respect to the object image P1.

FIG. 14B shows the relationship between the image pickup area and an object image P4 shifted down by one pixel with respect to the object image P1.

Four images of the same object can be obtained by imaging the object while sequentially shifting the object image by one pixel to the right, the lower right hand direction, and down with respect to the object image P1 in the above manner.

Although these four images are obtained by imaging the same object, the pixels of the actually picked-up images are partly different from each other. Note, for example, the upper right pixels of the object images formed in the image pickup area in FIGS. 13A, 13B, 14A, and 14B. The pixel in FIG. 13A is Y (yellow). The pixel in FIG. 13B is C (cyan). The pixel in FIG. 14A is M (magenta). The pixel in FIG. 14B is G (green).

As described above, by imaging the same object while shifting the object image pixel by pixel, four images can be obtained. The number of images in this case is four times larger than that obtained by a conventional image pickup technique. A high-quality image can be obtained by synthesizing these four images into one image.

According to the conventional high-quality image input apparatus, however, owing to the above method of obtaining a high-quality image, if the apparatus moves, it cannot image the same object while accurately shifting the object image pixel by pixel. In addition, since the conventional high-quality image input apparatus has no special measures against motions, if the image pickup unit or the entire apparatus moves, a pixel shift which demands fine control is difficult to perform. For this reason, a stable, high-quality image cannot always be obtained.

SUMMARY OF THE INVENTION

The present invention has been made in consideration of the above problem, and has as its object to eliminate the influence of motions by temporarily inhibiting an image signal from being recorded on a recording means when an image pickup unit or an entire image input apparatus moves.

According to a feature of the present invention, there is provided a high-quality image input apparatus for recording an image signal output from an image pickup device on recording means, holding a plurality of images, and synthesizing the images into one image, comprising motion detection means for detecting a motion level of an optical system for inputting light from an object, and control means for performing control to temporarily inhibit the image signal from being recorded on the recording means when a motion detection signal is output from the motion detection means.

According to another feature of the present invention, there is provided a high-quality image input apparatus for recording an image signal output from an image pickup device on recording means, holding a plurality of images, and synthesizing the images into one image, comprising a motion detector for detecting a moving amount of an image by using the image signal picked up by the image pickup device, and detecting a motion level of an optical system up to the image pickup device on the basis of the detection result, and control means for performing control to temporarily inhibit the image signal from being recorded on the recording means, when a motion is detected by the motion detector.

According to still another feature of the present invention, there is provided a high-quality image input apparatus, comprising an optical axis changing device for changing an optical axis for light from an object, an image pickup device for picking up light passing through the optical axis changing device, an optical axis control device for controlling a position of the optical axis changing device, recording means for recording an image signal output from the image pickup device and holding a plurality of images, an image synthesization device for synthesizing the plurality of images held by the recording means into one image, motion detection means for detecting a motion level of an optical system from the optical axis changing device to the image pickup device, and control means for controlling operations of the optical axis control device, the recording means, and the image synthesization device to temporarily inhibit the image signal from being recorded on the recording means when a motion detection signal is output from the motion detection means.

According to still another feature of the present invention, there is provided a high-quality image input apparatus, comprising an optical axis changing device for changing an optical axis for light from an object, an image pickup device for picking up light passing through the optical axis changing device, an optical axis control device for controlling an operation of the optical axis changing device, recording means for recording an image signal output from the image pickup device and holding a plurality of images, an image synthesization device for synthesizing the plurality of images held by the recording means into one image, a motion detector for detecting a moving amount of an image by using an image signal picked up by the image pickup device, and detecting a motion level of an optical system up to the image pickup device on the basis of the detection result, and control means for controlling operations of the optical axis control device, the recording means, and the image synthesization device to temporarily inhibit the image signal from being recorded on the recording means when a motion is detected by the motion detector.

According to still another feature of the present invention, there are provided a high-quality image input apparatus, comprising an optical axis changing device for changing an optical axis for light from an object, an image pickup device for picking up light passing through the optical axis changing device, a motion detector for detecting a moving amount of an image by using an image signal picked up by the image pickup device, an optical axis control device for controlling the optical axis changing device in accordance with information from the motion detector, a driver for moving the optical axis changing device to a predetermined position on the basis of a control signal supplied from the optical axis control device, a position detection device for detecting a position of the optical axis changing device and supplying resultant position data to the optical axis control device, motion detection means for detecting a motion level of an optical system from the optical axis changing device to the image pickup device, recording means for recording an image signal output from the image pickup device and holding a plurality of images, an image synthesization device for synthesizing the plurality of images held by the recording means into one image, and control means for controlling operations of the optical axis control device, the recording means, and the image synthesization device to temporarily inhibit the image signal from being recorded on the recording means when a movement amount of an image which is detected by the motion detector is not less than a predetermined movement amount or a motion detection signal is output from the motion detection means.

According to still another feature of the present invention, there is provided a high-quality image input apparatus, comprising an optical axis changing device for changing an optical axis for light from an object, an image pickup device for picking up light passing through the optical axis changing device, a motion detector for detecting a movement amount of an image and a motion level by using an image signal picked up by the image pickup device, an optical axis control device for controlling the optical axis changing device in accordance with information from the motion detector, a driver for movement the optical axis changing device to a predetermined position on the basis of a control signal supplied from the optical axis control device, a position detection device for detecting a position of the optical axis changing device and supplying resultant position data to the optical axis control device, recording means for recording an image signal output from the image pickup device and holding a plurality of images, an image synthesization device for synthesizing the plurality of images held by the recording means into one image, and control means for controlling operations of the optical axis control device, the recording means, and the image synthesization device to temporarily inhibit the image signal from being recorded on the recording means, when a signal indicating a movement amount of an image which is not less than a predetermined value or a signal indicating a motion level not less than a predetermined level is output from the motion detector.

According to the present invention having the above technical means, when the image pickup unit or the entire image input apparatus moves, the motion detection means detects the motion, thereby temporarily inhibiting an image signal from being recorded on the recording means. Even if the image pickup unit or the entire image input apparatus moves, the influence of the motion can be eliminated.

In addition, according to other features of the present invention, when the image pickup unit or the entire image input apparatus moves, the motion detector detects the motion to temporarily inhibit an image signal 205 from being recorded on a recording means 117. Even if, therefore, the image pickup unit or the entire image input apparatus moves, the influence of the motion can be eliminated. In addition, even if an object moves, the apparatus can temporarily inhibit the image signal 205 from being recorded on the recording means 117.

The above and other objects, features, and advantages of the present invention will be apparent from the following detailed description in conjunction with the accompanying drawings and the appended claims.

BRIEF DESCRIPTION OF THE DRAWINGS

FIGS. 13A and 13B are representational views of object images formed on an image pickup area of a CCD;

DETAILED DESCRIPTION OF THE PREFERRED EMBODIMENTS

Figure 1:
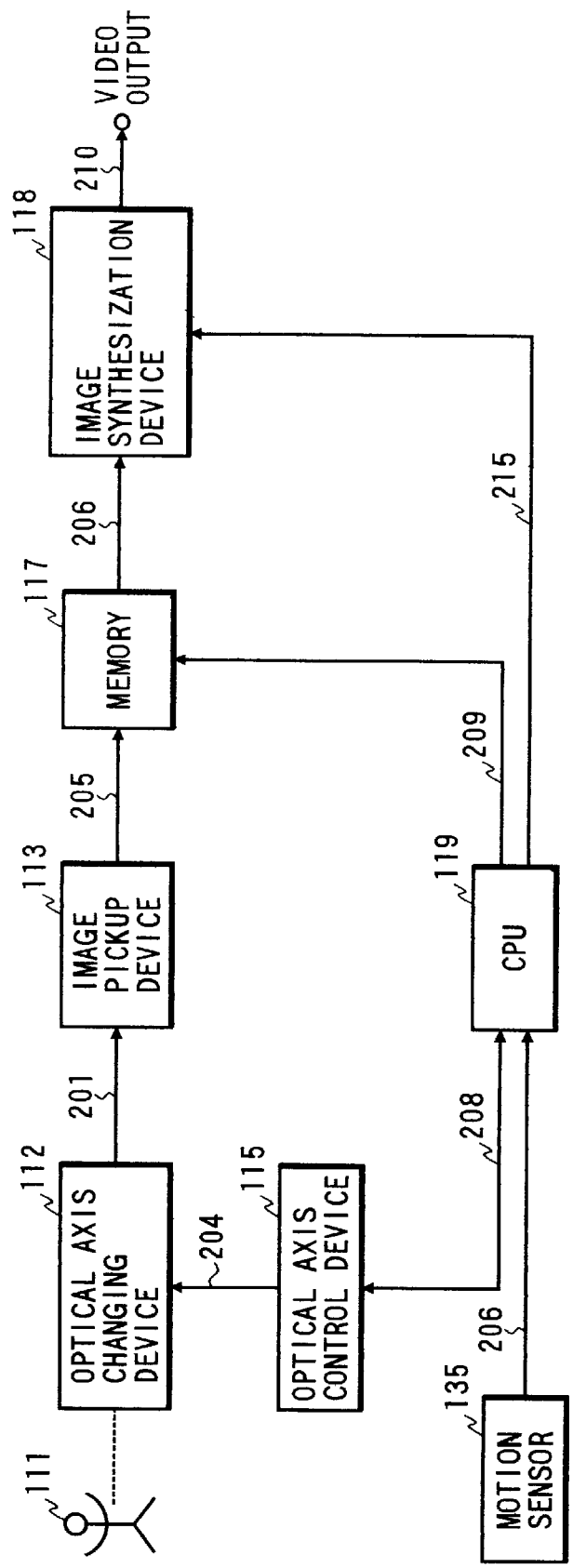
FIG. 1 is a block diagram showing a schematic arrangement corresponding to one aspect of the present invention.

A high-quality image input apparatus having a motion compensation function according to the present invention will be described in detail below with reference to the accompanying drawings. FIG. 1 is a block diagram showing a schematic arrangement corresponding to one aspect of the present invention.

As shown in FIG. 1, this high-quality image input apparatus includes an optical axis changing device 112, an image pickup device 113, an optical axis control device 115, a memory 117, an image synthesization device 118, a motion sensor 135, and a CPU 119.

The optical axis changing device 112 changes the optical axis for light from an object 111. The image pickup device 113 picks up light passing through the optical axis changing device 112.

The optical axis control device 115 controls the position of the optical axis changing device 112. The memory 117 serves as a recording means, which is used to record an image signal 205 output from the image pickup device 113 and hold a plurality of images.

The image synthesization device 118 synthesizes the plurality of images, held by the recording means 117, into one image.

The motion sensor 135 is used as a motion detection means. The motion sensor 135 detects the motion level of an optical system from the optical axis changing device 112 to the image pickup device 113.

The CPU 119 is used as a control means. When a motion detection signal is output from the motion sensor 135, the CPU 119 controls the operations of the optical axis control device 115, the memory 117, and the image synthesization device 118 to temporarily inhibit the image signal 205 from being recorded on the memory 117. The operation of the high-quality image input apparatus having this arrangement will be described later as the first embodiment.

The constituent elements of a high-quality image input apparatus corresponding to an another aspect of the present invention will be described next with reference to FIG. 2. The same reference numerals as in FIG. 1 denote the same constituent elements having the same functions in FIG. 2, and a detailed description thereof will be omitted.

Figure 2:
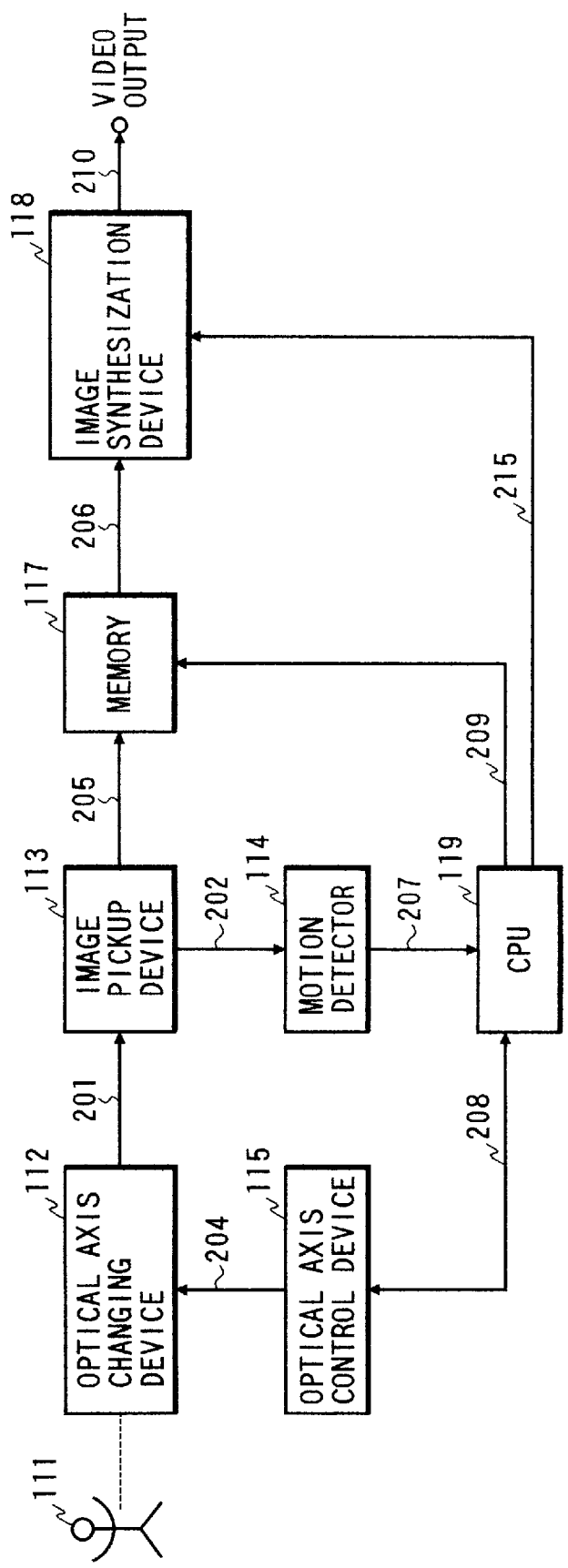
FIG. 2 is a block diagram showing a schematic arrangement corresponding to an another aspect of the present invention.

As shown in FIG. 2, this high-quality image input apparatus uses a motion detector 114 instead of the motion sensor 135 in the high-quality image input apparatus shown in FIG. 1. The motion detector 114 detects the movement amount of an image by using the image signal 205 picked up by the image pickup device 113, and detects the motion level of an optical system up to the image pickup device 113 on the basis of the detection result.

When motions are detected by the motion detector 114, a CPU 119 in FIG. 2 controls the operations of the optical axis control device 115, the memory 117, and the image synthesization device 118 to temporarily inhibit the image signal 205 from being recorded on the memory 117. The operation of the high-quality image input apparatus having this arrangement will be described later as the second embodiment.

Figure 3:
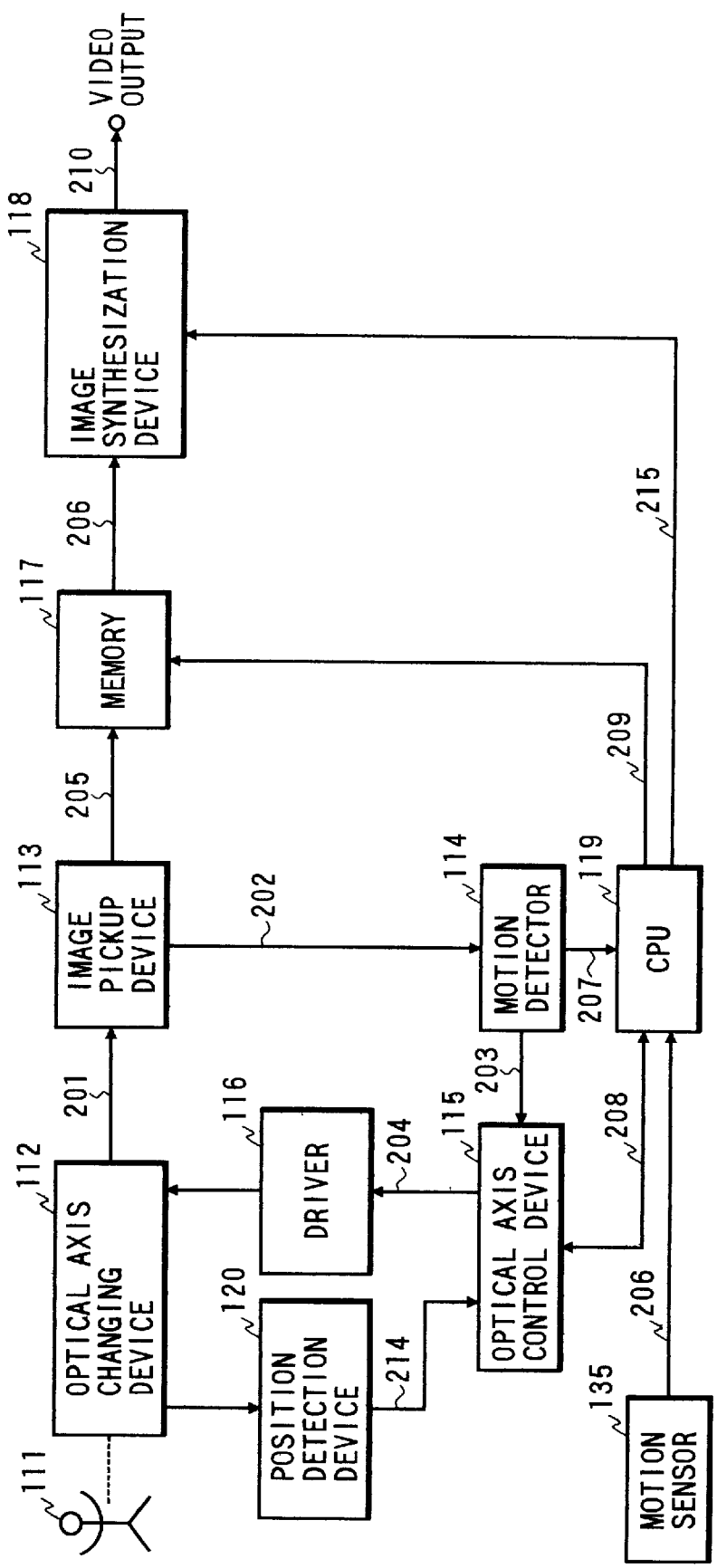
FIG. 3 is a block diagram showing a schematic arrangement corresponding to an another aspect of the present invention.

A high-quality image input apparatus corresponding to an another aspect of the present invention will be described next with reference to the block diagram of FIG. 3. This apparatus has both a motion sensor 135 and a motion detector 114. With this arrangement, when the movement amount of an image which is detected by the motion detector 114 is equal to or larger than a predetermined movement amount, or a motion detection signal is output from the motion sensor 135, the CPU 119 controls the operations of the optical axis control device 115, the memory 117, and the image synthesization device 118 to temporarily inhibit the image signal 205 from being recorded on the memory 117. The operation of the high-quality image input apparatus having this arrangement will be described later as the third embodiment.

Figure 4:
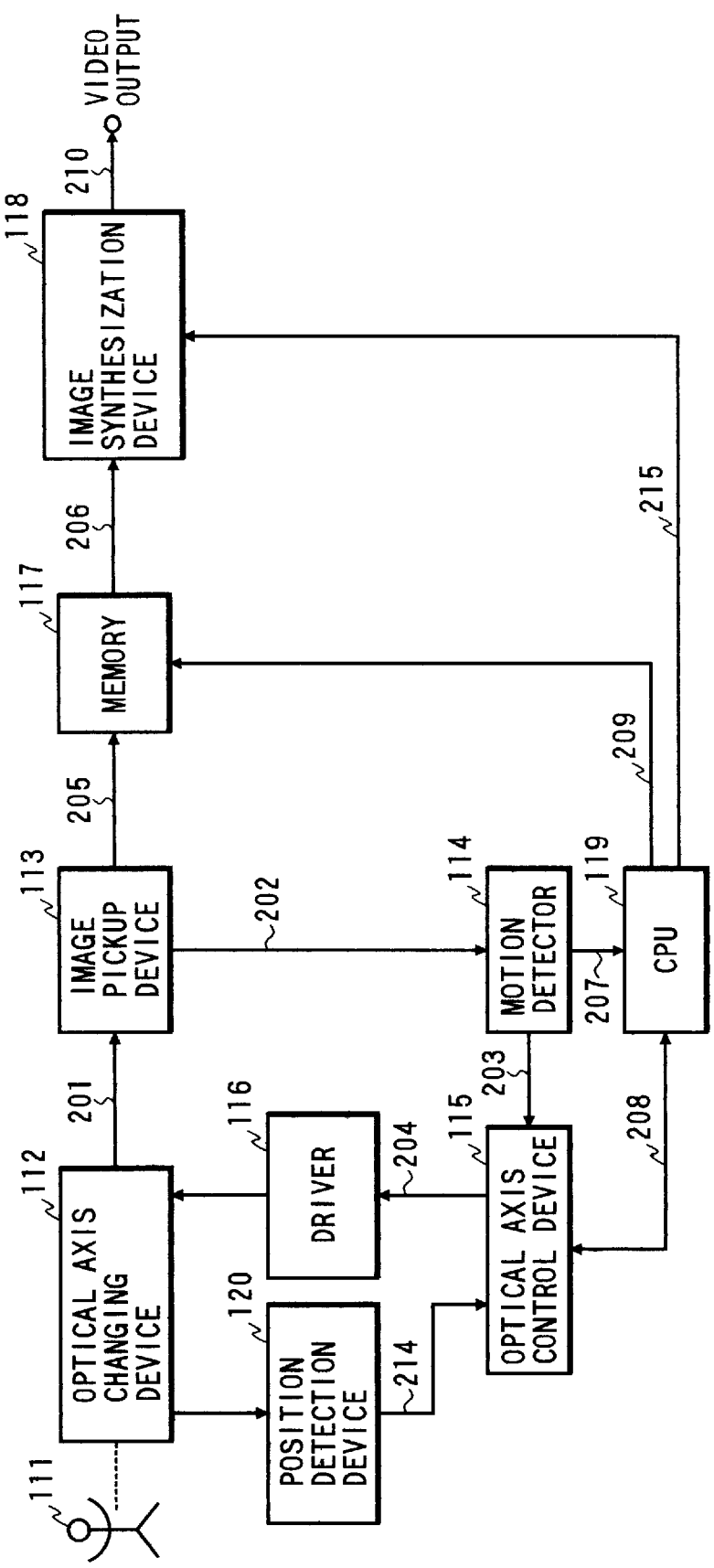
FIG. 4 is a block diagram showing a schematic arrangement corresponding to an another aspect of the present invention.

A high-quality image input apparatus corresponding to an another aspect of the present invention will be described next with reference to the block diagram of FIG. 4. This apparatus includes a motion detector 114 for detecting the movement amount of an image by using an image signal 202 picked up by an image pickup device 113 and also detecting a motion level, a driver 116 for movement the optical axis changing device 112 to a predetermined position on the basis of a control signal supplied from the optical axis control device 115, and a position detection device 120 for detecting the position of the optical axis changing device 112 and supplying the resultant position data to the optical axis control device 115.

When the motion detector 114 outputs a signal indicating the movement amount of an image which is equal to or larger than a predetermined value, or a signal 207 indicating a motion level equal to or higher than a predetermined level, the CPU 119 controls the operations of the optical axis control device 115, the memory 117, and the image synthesization device 118 to temporarily inhibit the image signal 205 from being recorded on the memory 117.

Embodiments of the present invention will be described in detail below with reference to FIGS. 5 to 11.

Figure 5:
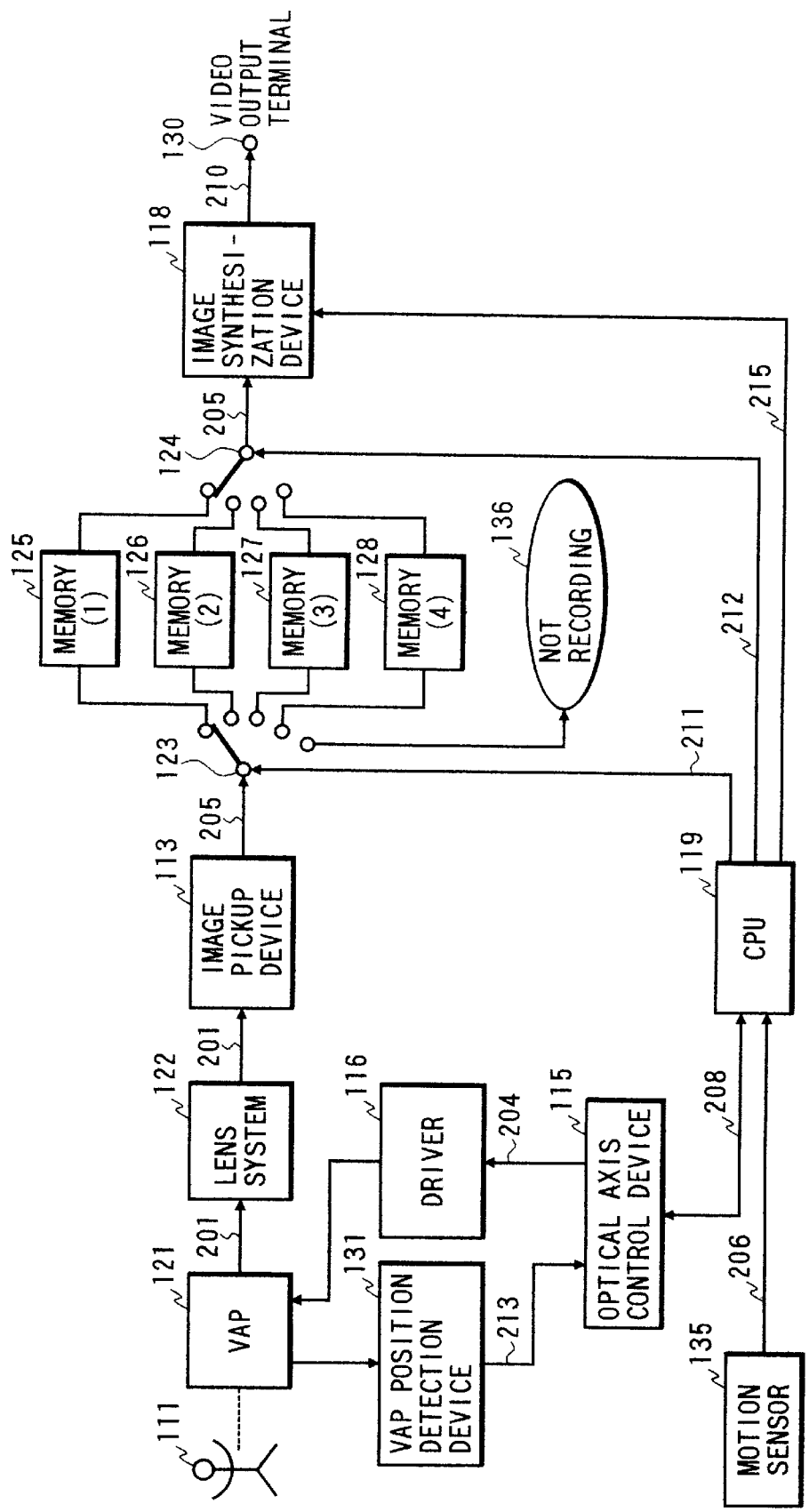
FIG. 5 is a block diagram showing the schematic arrangement of a high-quality image input apparatus having a motion compensation function according to the first embodiment of the present invention.

FIG. 5 is a block diagram showing the schematic arrangement of a high-quality image input apparatus having a motion compensation function according to the first embodiment of the present invention.

A description of the common part in the arrangement shown in FIG. 5 and the above conventional arrangement will be omitted, and only a newly added function in the first embodiment of the present invention will be described.

The newly added function lies in the arrangement of a motion sensor 135 and a non-recording terminal 136.

The motion sensor 135 detects the motion level of the image pickup unit or the entire image input apparatus. The motion level detected by the motion sensor 135 is sent as a motion level signal 206 to a CPU 119.

The non-recording terminal 136 is selected by a memory selection switch 123 when an image signal 205 is not recorded on any of first frame memory (1) 125 to fourth frame memory (4) 128.

The operation of the high-quality image input apparatus in FIG. 5 will be described next. When the image pickup unit or the entire image input apparatus is moving, it is difficult to image an object while accurately shifting the object image pixel by pixel. For this reason, the motion sensor 135 detects the motion level of the image pickup unit or the entire image input apparatus. If the detected motion level is equal to or lower than the level at which there is no influence on an image pickup operation based on a pixel shift, the image input operation described in "Related Background Art" is continued.

On the contrary, if the detected motion level is equal to or higher than the level at which the image input operation is adversely affected, the CPU 119 switches the memory selection switch 123 to the non-recording terminal 136 to temporarily stop recording of the image signal 205. When the detected motion level becomes equal to or lower than the level at which there is no influence on an image pickup operation, the subsequent image input operation is started.

If the detected motion level is equal to or higher than the level at which an image input operation is adversely affected, and is higher than a predetermined level (which is too high for just apparatus motions), a change in the object is determined, instead of just motions. If it is determined that the object has changed, an image input operation is performed again from the beginning when the detected motion level becomes equal to or lower than the level at which there is no influence on an image pickup operation.

Assume that when the image signal is recorded on the second frame memory (2) 126, it is determined that the object has changed. In this case, when the detected motion level becomes equal to or lower than the level at which there is no influence on an image pickup operation, the apparatus performs an image input operation again from the beginning instead of inputting image data from the third frame memory (3) 127.

More specifically, three levels are set as the motion states of the image pickup unit or the entire image input apparatus. In the normal state in which no motions are caused, a normal operation is performed. In the state in which motions are caused, recording of an image is temporarily stopped. When an object has changed, a recording is stopped, and an image input operation is performed again from the beginning.

Figure 6:
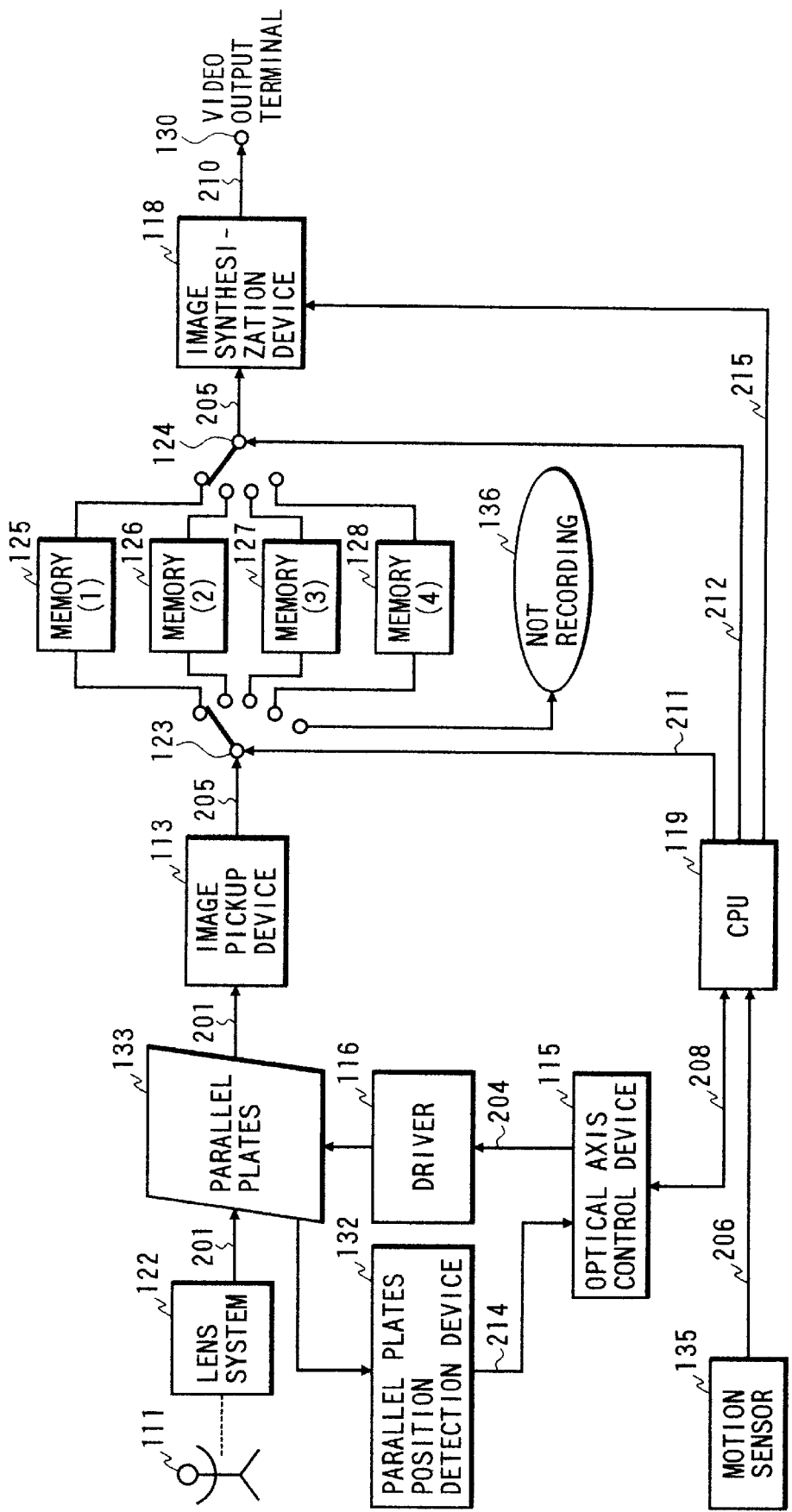
FIG. 6 is a block diagram showing the schematic arrangement of a high-quality image input apparatus having a motion compensation function according to the second embodiment of the present invention.

FIG. 6 is a block diagram showing the schematic arrangement of a high-quality image input apparatus having a motion compensation function according to the second embodiment of the present invention.

A description of the common parts in the arrangement shown in FIG. 6 and the first embodiment will be omitted, and only a newly added function in the second embodiment will be described. The newly added function lies in that parallel plates 133 are arranged in place of the VAP 121.

The parallel plates 133 serve to change the optical axis for light 201 from an object 111, and are used in place of the VAP 121 in the first embodiment. The parallel plates 133 are arranged between a lens system 122 and an image pickup device 113. By using the parallel plates 133 in this manner, the same operation as that in the first embodiment can be performed.

Figure 7:
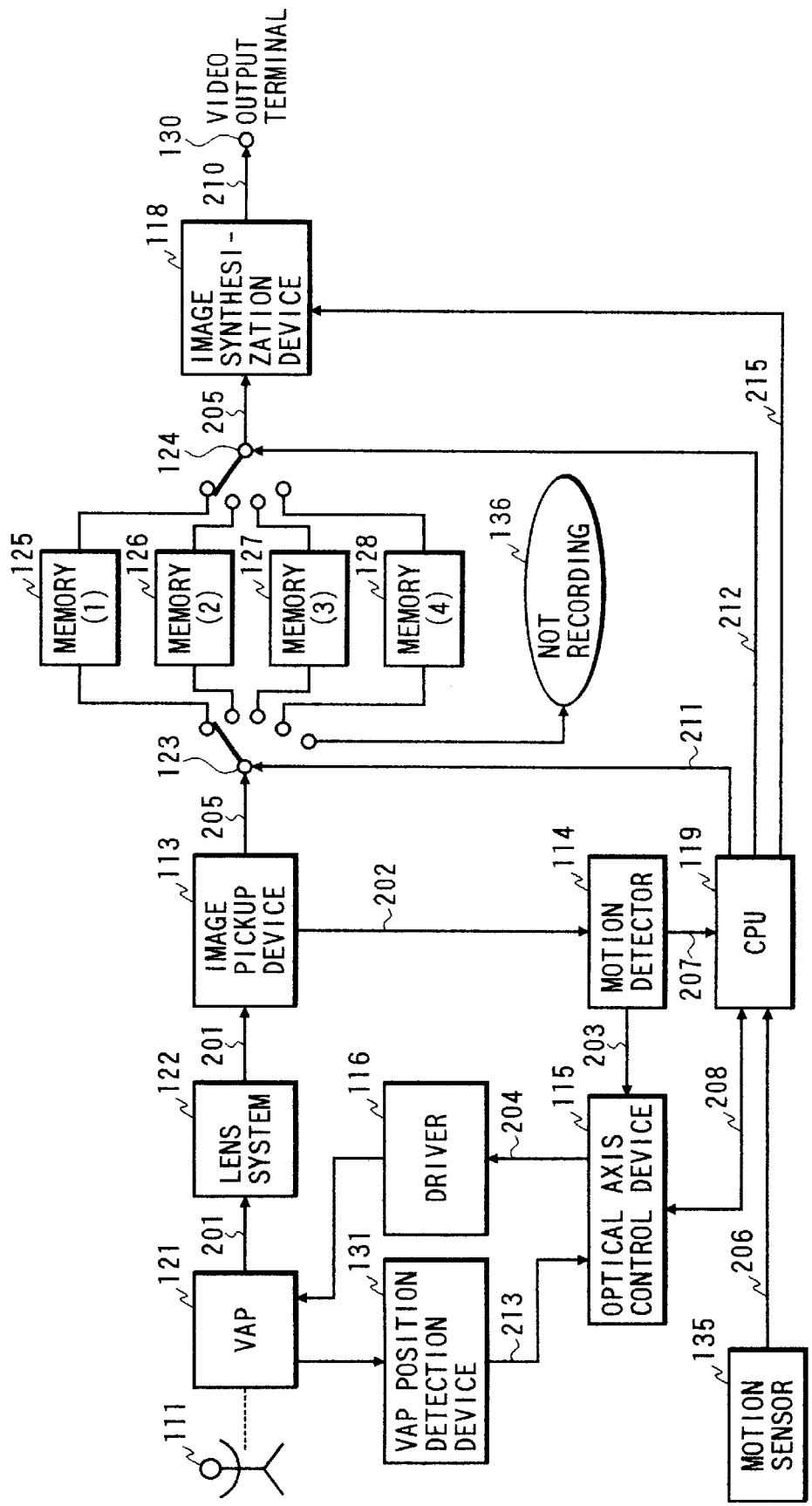
FIG. 7 is a block diagram showing the schematic arrangement of a high-quality image input apparatus having a motion compensation function according to the third embodiment of the present invention.

FIG. 7 is a block diagram showing the schematic arrangement of a high-quality image input apparatus having a motion compensation function according to the third embodiment of the present invention.

A description of the common parts in the arrangement shown in FIG. 7 and the second embodiment will be omitted, and only a newly added function in the third embodiment will be described. The newly added function lies in the arrangement of a motion detector 114.

The motion detector 114 detects the pixel shift amount of a picked-up image. The pixel shift amount detected by the motion detector 114 is sent as pixel shift information 203 to an optical axis control device 115. By adding the motion detector 114 to the apparatus, an optical axis can be accurately controlled.

Figure 8:
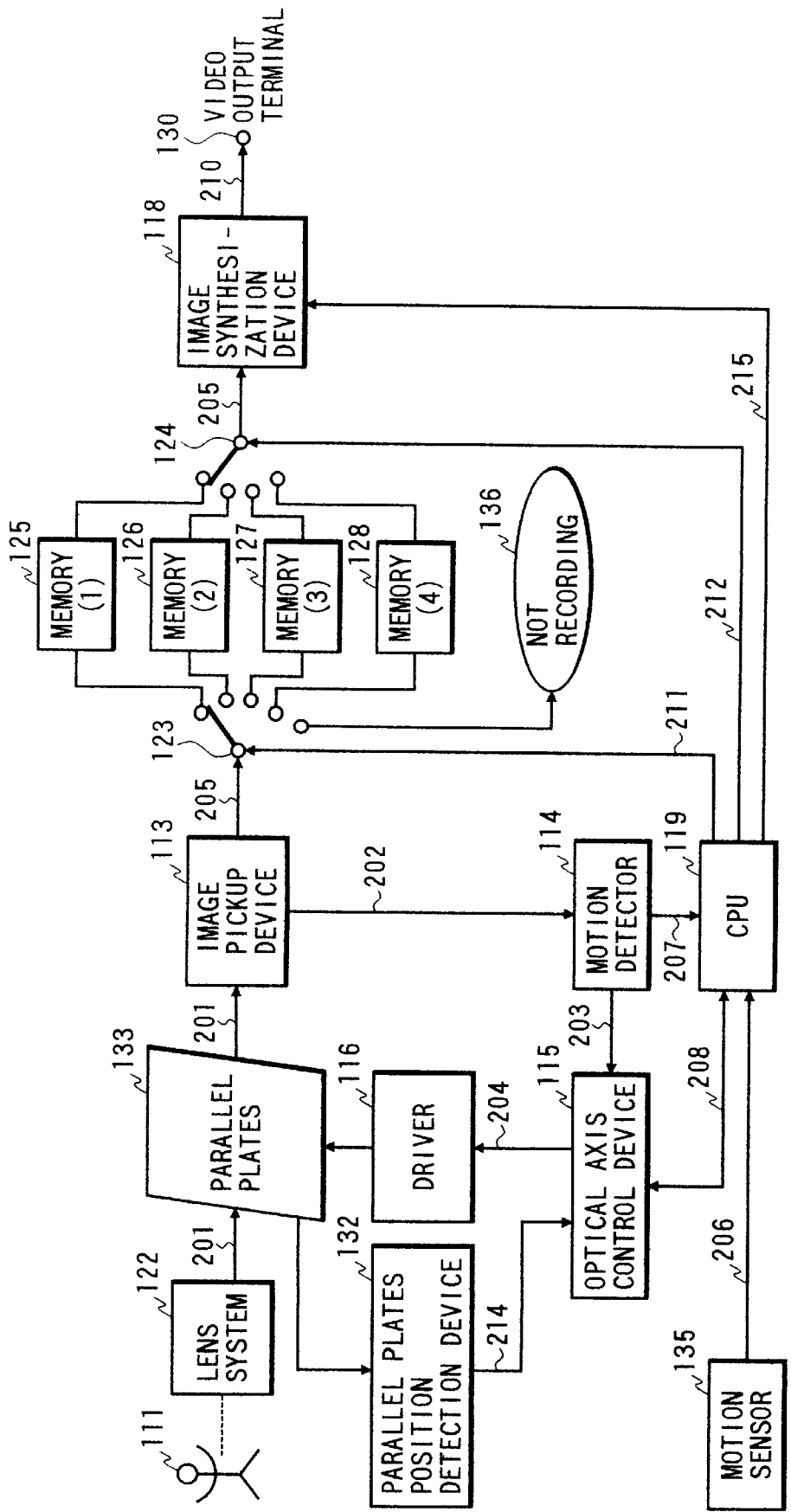
FIG. 8 is a block diagram showing the schematic arrangement of a high-quality image input apparatus having a motion compensation function according to the fourth embodiment of the present invention.

FIG. 8 is a block diagram showing a high-quality image input apparatus having a motion compensation function according to the fourth embodiment.

A description of the common parts in the arrangement shown in FIG. 8 and the third embodiment will be omitted, and only a newly added function in the fourth embodiment will be described. The newly added function lies in that parallel plates 133 are arranged in place of the VAP 121.

The parallel plates 133 serve to change the optical axis for light from an object, and are used in place of the VAP 121 in the third embodiment. The parallel plates 133 are arranged between a lens system 122 and an image pickup device 113. By using the parallel plates 133, the same operation as that in the third embodiment can be performed.

Figure 9:
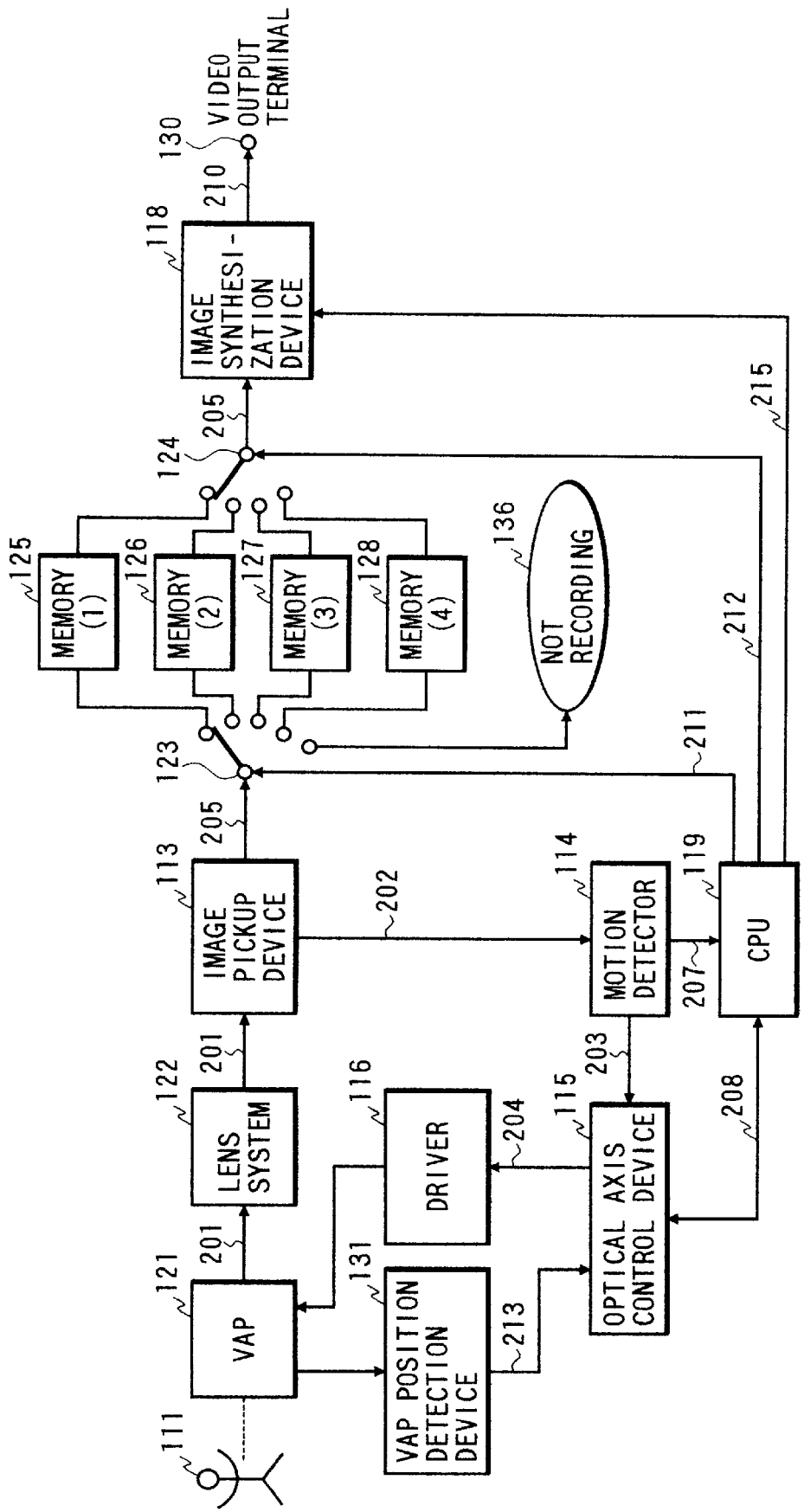
FIG. 9 is a block diagram showing the schematic arrangement of a high-quality image input apparatus having a motion compensation function according to the fifth embodiment of the present invention.

FIG. 9 is a block diagram showing the schematic arrangement of a high-quality image input apparatus having a motion compensation function according to the fifth embodiment of the present invention.

A description of the common parts in the arrangement shown in FIG. 9 and the fifth embodiment will be omitted, and only a newly added function in the fifth embodiment will be described. The newly added function lies in that a motion detector 114 is used to detect a motion level without using the motion sensor 135.

In the third embodiment, the motion detector 114 detects a pixel shift amount. In the fifth embodiment, however, the motion detector 114 detects both a pixel shift amount and a motion level. By detecting a motion level using the motion detector 114 instead of the motion sensor 135, the same operation as that in the third embodiment can be performed.

Figure 10:
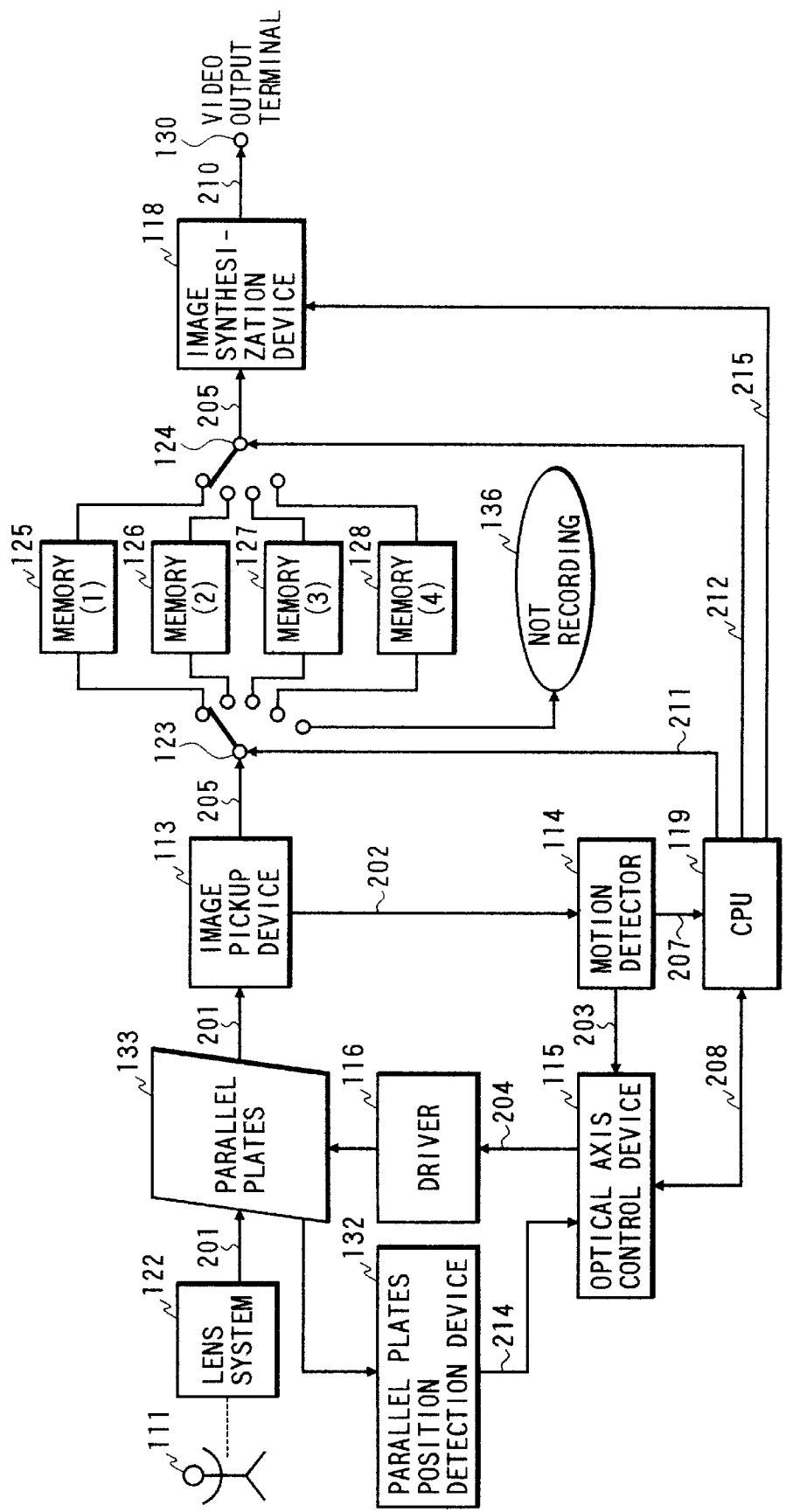
FIG. 10 is a block diagram showing the schematic arrangement of a high-quality image input apparatus having a motion compensation function according to the sixth embodiment of the present invention.

FIG. 10 is a block diagram showing a high-quality image input apparatus having a motion compensation function according to the sixth embodiment of the present invention.

A description of the common parts in the arrangement shown in FIG. 10 and the fifth embodiment will be omitted, and only a newly added function in the fourth embodiment will be described. The newly added function lies in that parallel plates 133 are arranged in place of the VAP 121.

The parallel plates 133 serve to change the optical axis for light from an object, and are used in place of the VAP 121 in the fifth embodiment. The parallel plates 133 are arranged between a lens system 122 and an image pickup device 113. By using the parallel plates 133, the same operation as that in the fifth embodiment can be performed.

Figure 11:
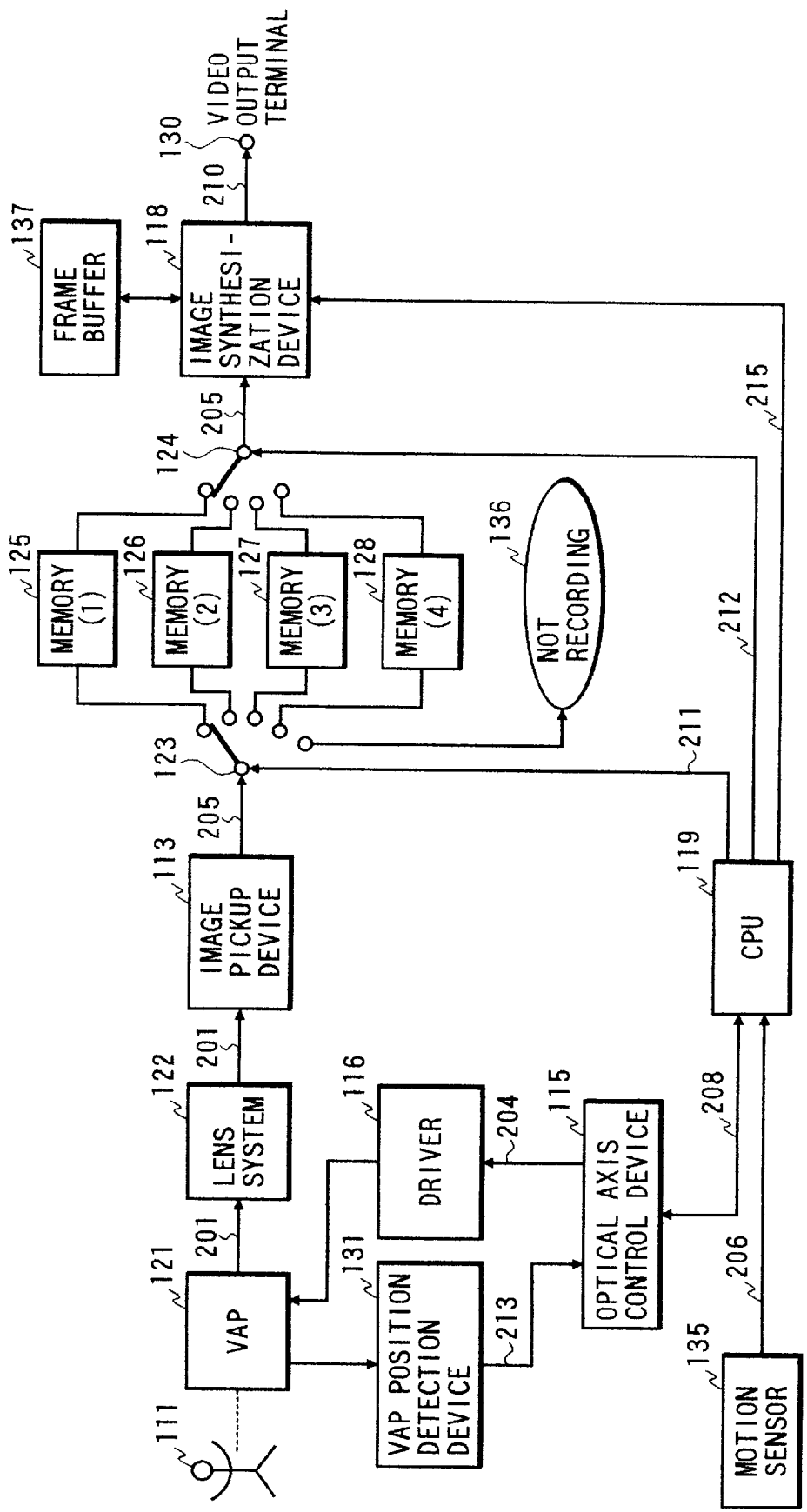
FIG. 11 is a block diagram showing the schematic arrangement of a high-quality image input apparatus having a motion compensation function according to the seventh embodiment of the present invention.
Figure 12:
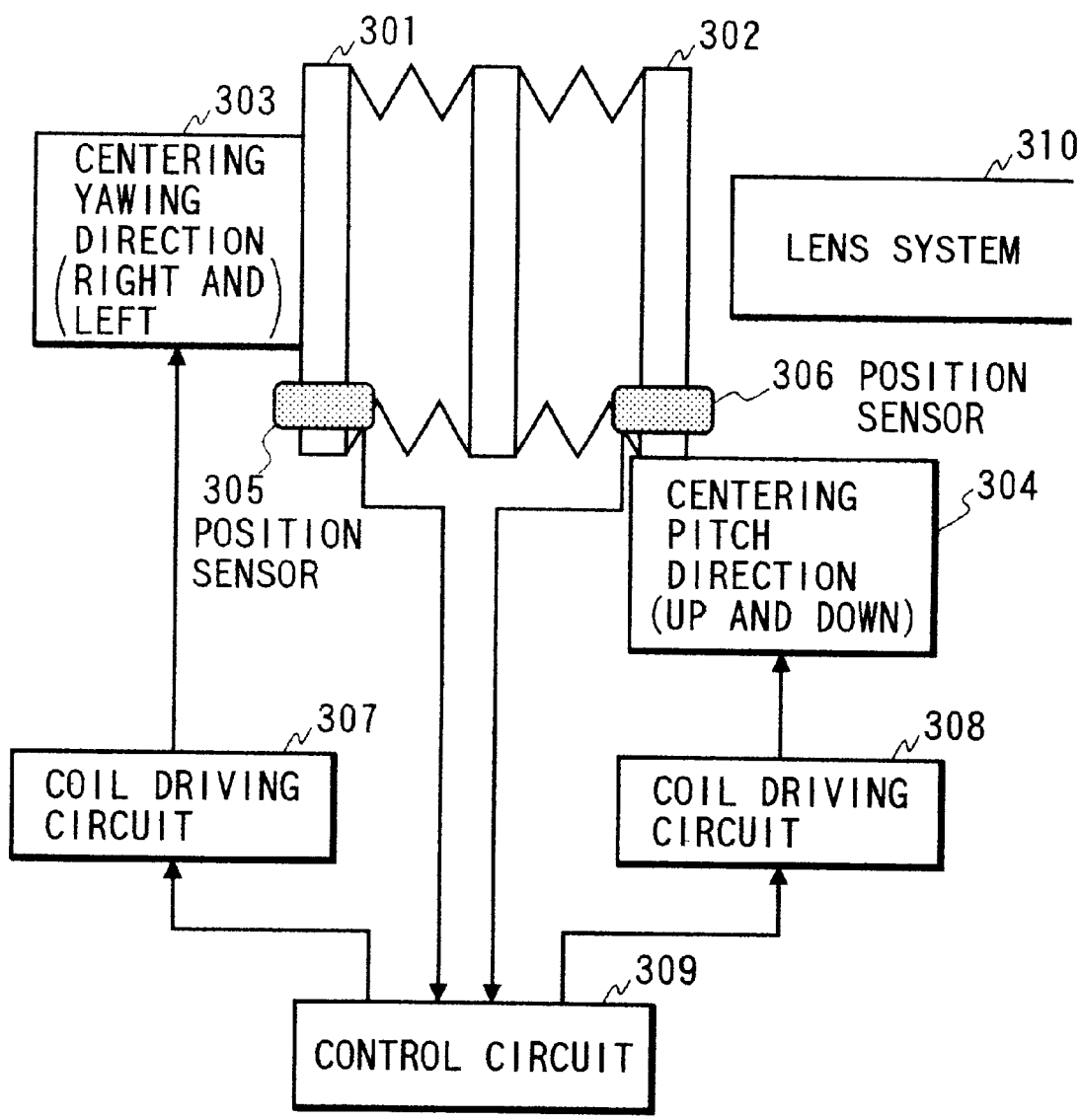
FIG. 12 is a block diagram showing the schematic arrangement of a VAP.
Figure 14A:
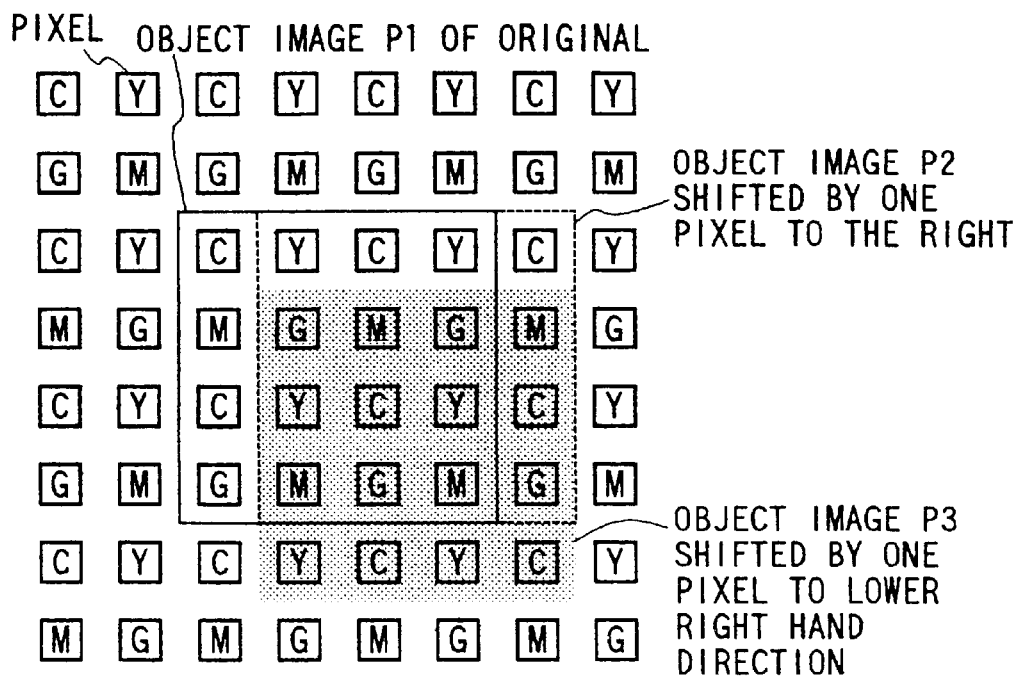
FIGS. 14A and 14B are representational views of object images formed on an image pickup area of a CCD.
Figure 14B:
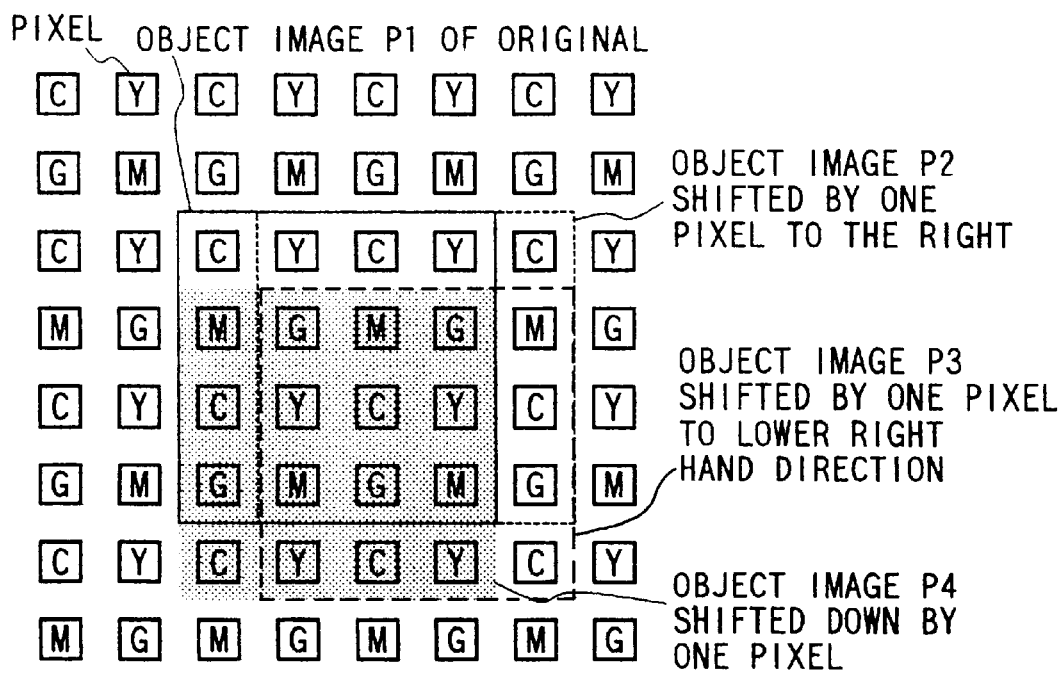
Figure 15:
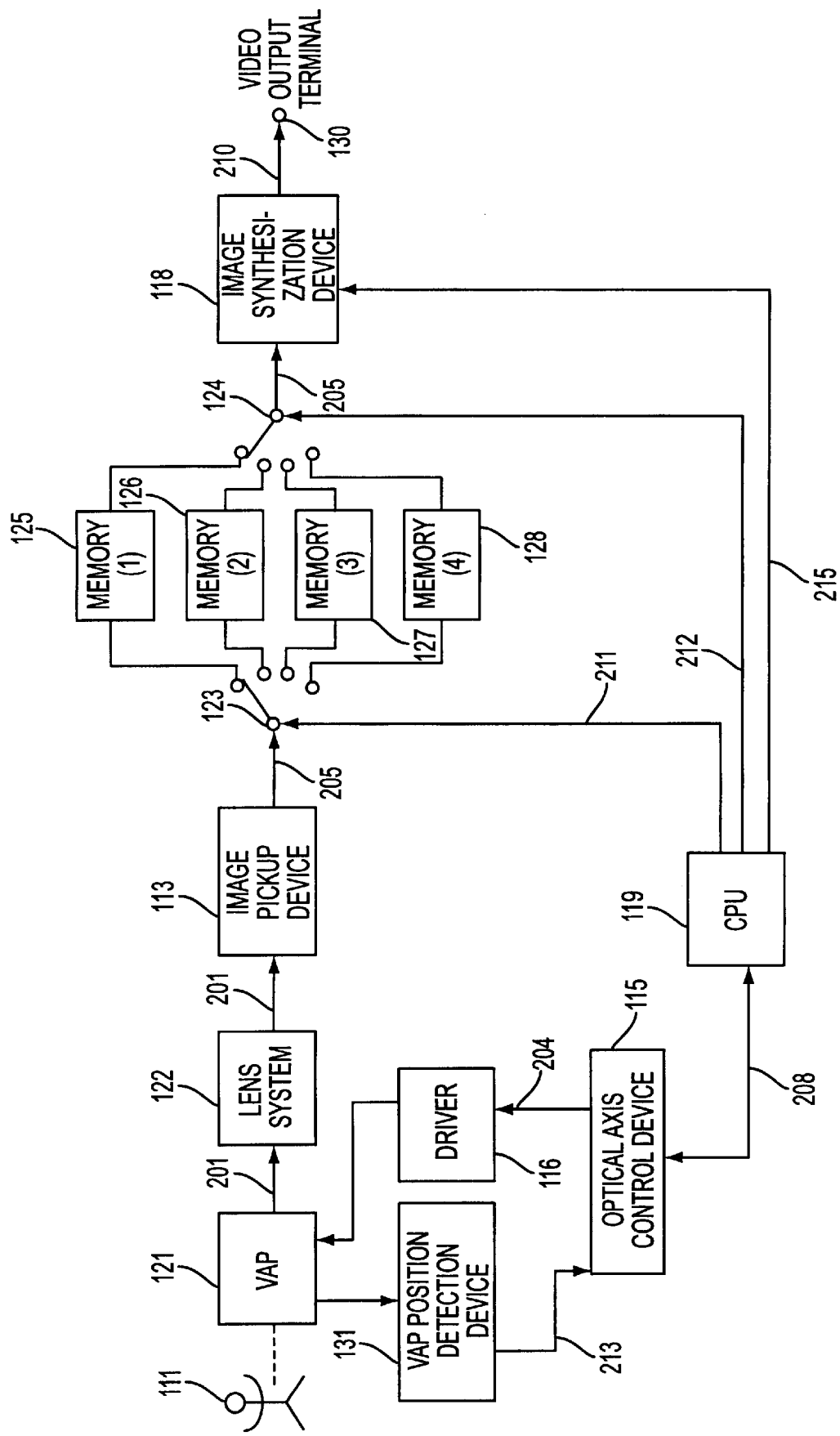
FIG. 15 is a block diagram showing a schematic arrangement of a conventional high-quality image input apparatus.

FIG. 11 is a block diagram showing a high-quality image input apparatus having a motion compensation function according to the seventh embodiment of the present invention.

A description of the common parts in the arrangement shown in FIG. 11 and the first embodiment will be omitted, and only a newly added function in the seventh embodiment will be described. The newly added function lies in the arrangement of a frame buffer 137. The frame buffer 137 is arranged in an image synthesization device 118. The latest frame is always recorded on the frame buffer 137.

In the first embodiment, when the motion sensor 135 detects motions, or the object 111 has changed, the memory selection switch 123 selects the non-recording terminal 136. For this reason, the image synthesization device 118 cannot synthesize a new frame image.

In the seventh embodiment, during an interval in which any new frame image cannot be synthesized by the image synthesization device 118, image data is read out from the frame buffer 137.

The above embodiments have the following unique effects.

In the first embodiment, even if the image pickup unit of the high-quality image input apparatus having the motion compensation function or the entire apparatus moves, a stable, high-quality image can always be obtained. In addition, even if an object changes, an image input operation can be performed without any operation error.

In the second embodiment, since the parallel plates 133 are used for the optical axis changing device, an apparatus arrangement smaller in size than that in the first embodiment can be realized.

In the third embodiment, with the additional use of the motion detector 114, accurate pixel shifts can be made.

In the fourth embodiment, since the parallel plates 133 are used for the optical axis changing device, an apparatus arrangement smaller in size than that in the third embodiment can be realized.

In the fifth embodiment, since the motion sensor 135 is not used, the apparatus can be realized at a low cost, and the apparatus arrangement can be reduced in size.

In the sixth embodiment, since the parallel plates 133 are used for the optical axis changing device, an apparatus arrangement smaller in size than that in the third embodiment can be realized.

In the seventh embodiment, with the additional use of the frame buffer 137, even while the image pickup unit of the high-quality image input apparatus having the motion compensation function or the entire apparatus moves, a high-quality image picked up in the previous frame can be output.

In addition to the above embodiments in which each apparatus is designed to perform a 1-pixel shift operation, the present invention can be applied to other types of apparatuses, e.g., those designed to perform a ½-pixel shift operation, a ¼-pixel shift operation, a 3/2-pixel shift operation, and a combination of ½- and 1-pixel shift operations.

Image data can be sent to a computer as well as the video output terminal to synthesize an image.

In addition, the optical axis changing device may be controlled on the basis of information from the motion detector 114 without using the position detection device.

When an image input operation is to be performed again from the beginning after an object changes, a memory other than the first frame memory (1) 125 may be used as the first frame memory to start the operation. Other various changes and modifications of the above embodiments can be made without departing from the spirit and scope of the invention.

As has been described above, the present invention includes the motion detection means for detecting the motion level of the optical system from the optical axis changing device to the image pickup unit. For this reason, when a motion detection signal is output from the motion detection means, the apparatus can temporarily inhibit an image signal from being recorded on the recording means. With this operation, a pixel shift operation can be accurately performed, and a high-quality image can always be obtained.

According to other features of the present invention, the apparatus can temporarily inhibits an image signal from being recorded on the recording means in a case wherein the object moves as well as in a case wherein the optical system from the optical axis changing device to the image pickup unit moves. A pixel shift operation can therefore be performed more accurately, and a high-quality image can always be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus for recording image signals of a plurality of images output from an image pickup device and synthesizing the plurality of recorded images, said apparatus comprising:

recording means for recording an image signal of a plurality of images and for outputting the plurality of images, the image signal recorded by said recording means being outputted from the image pickup device;

image synthesization means for synthesizing the plurality of images outputted from said recording means;

motion detection means for detecting a motion level of an optical system and for outputting a motion detection signal; and control means for controlling said recording means and said image synthesization means to temporarily inhibit recording operation of said recording means and synthesization operation of said image synthesization means in a case in which the motion detection signal is outputted from said motion detection means.

2. An apparatus according to claim 1, wherein said motion detection means is a vibration sensor for physically detecting vibration of the optical system.

3. An apparatus according to claim 2, wherein the optical system provides the plurality of images by shifting a position of incident light to the image pickup device by a predetermined amount.

4. An apparatus according to claim 3, wherein the optical system includes a variable angle prism.

5. An apparatus according to claim 3, wherein said control means inhibits the recording and synthesization of the image signal in the case that motion of more than a predetermined level is detected.

6. An apparatus according to claim 1, wherein said control means inhibits the recording and synthesization of the image signal in the case that motion of more than a predetermined level is detected.

7. An apparatus according to claim 1, wherein said motion detection means detects motion of an image on the basis of an output signal of the image pickup device.

8. An apparatus according to claim 7, wherein the optical system provides the plurality of images by shifting a position of incident light to the image pickup device by a predetermined amount.

9. An apparatus according to claim 1, wherein said motion detection means is a motion detector, said motion detector detects (i) a movement amount of at least one of the plurality of images based on the image signal from the image pickup device and produces a detection result, and (ii) the motion level of the optical system up to the image pickup device based on the detection result.

10. An image input apparatus having a motion compensation function, said apparatus comprising:

an optical axis changing device for changing an optical axis for light from an object;

an image pickup device for picking up light passing through said optical axis changing device, and for outputting an image signal;

an optical axis control device for controlling a position of said optical axis changing device;

recording means for recording an image signal of a plurality of images and for outputting the plurality of images, the image signal recorded by said recording means being outputted from said image pickup device;

an image synthesization device for synthesizing the plurality of images outputted from said recording means;

motion detection means for detecting a motion level of an optical system from said optical axis changing device to said image pickup device, and for outputting a motion detection signal; and control means for controlling operations of said optical axis control device, said recording means, and said image synthesization device to temporarily inhibit the image signal from being recorded on said recording means in a case in which the motion detection signal is outputted from said motion detection means.

11. An apparatus according to claim 10, wherein said recording means includes a plurality of image memories and wherein said image synthesization device synthesizes a plurality of image signals stored in said plurality of image memories to generate a high definition image.

12. An apparatus according to claim 3, wherein said motion detection means is a motion detector, said motion detector detects (i) a movement amount of at least one of the plurality of images based on the image signal from said image pickup device and produces a detection result, and (ii) the motion level of the optical system from said optical axis changing device to said image pickup device based on the detection result.

13. An image pickup device comprising:

image pickup means for picking up images and for outputting a plurality of images;

synthesization means for receiving the plurality of images output from said image pickup means, holding the plurality of received images, and synthesizing an image from the plurality of received images which are held;

detection means for detecting a motion of said image pickup device and for producing a detection output; and control means for controlling a holding operation of said synthesization means in accordance with the detection output from said detection means.

14. A device according to claim 13, wherein said detection means comprises a sensor which is different from said image pickup means to detect a motion of said image pickup device.

15. A device according to claim 13, wherein said detection means detects a motion of said image pickup device on the basis of an output from said image pickup means.

16. A device according to claim 13, wherein positions of the plurality of images are shifted from each other.

17. A device according to claim 13, wherein said control means inhibits use of some images of the plurality of images in accordance with the detection output from said detection means.

18. A method of picking up an image with an image pickup device, said method comprising the steps of:

picking up an image with an image pickup device;

outputting data representing a plurality of images having a predetermined resolution from the image pickup device;

processing the data representing the plurality of images output from the image pickup device by holding the data representing the plurality of images output from the image pickup device, and synthesizing an image from the plurality of images which are held;

detecting a motion of the image pickup device and producing a detection output; and controlling a synthesizing operation of said processing step in accordance with the detection output from said detecting step.

19. An image pickup device comprising:

image pickup means for picking up images and for outputting a plurality of images;

synthesization means for holding the plurality of images output from said image pickup means, and synthesizing an image formed by pixel data from the plurality of images which are held;

detection means for detecting a motion of said image pickup means and producing a detection output; and control means for controlling a synthesizing operation of said synthesization means in accordance with the detection output from said detection means.

20. A method of picking up an image with an image pickup device, said method comprising the steps of:

picking up an image;

holding a plurality of picked up images;

synthesizing an image formed by pixel data from the plurality of images which are held using a synthesizing operation;

detecting a motion of the image pickup device and producing a detection output; and controlling the synthesizing operation for synthesizing the image in accordance with the detection output from said detecting step.

* * * * *

UNITED STATES PATENT AND TRADEMARK OFFICE
CERTIFICATE OF CORRECTION

PATENT NO. : 6,359,648 B1
DATED : March 19, 2002
INVENTOR(S) : Toshihiro Fukasaka It is certified that error appears in the above-identified patent and that said Letters Patent is hereby corrected as shown below:

<u>Title page,</u>
Item [56], References Cited, "5,569,190" should read -- 5,568,190 --.

<u>Column 5,</u>
Line 22, "movement" should read -- moving --.

<u>Column 11,</u>
Line 29, "inhibits" should read -- inhibit --.

<u>Column 12,</u>
Line 57, "claim 3" should read -- claim 10 --.

Signed and Sealed this

Twelfth Day of November, 2002

*Attest:*

JAMES E. ROGAN
*Director of the United States Patent and Trademark Office*

*Attesting Officer*